United States Patent [19]

Bedard et al.

[11] Patent Number: 5,064,790

[45] Date of Patent: Nov. 12, 1991

[54] HIGH DENSITY CORDIERITE CERAMICS FROM ZEOLITE

[75] Inventors: Robert L. Bedard, Fishkill; Edith M. Flanigen, White Plains, both of N.Y.

[73] Assignee: UOP, Des Plaines, Ill.

[21] Appl. No.: 596,149

[22] Filed: Oct. 11, 1990

Related U.S. Application Data

[63] Continuation-in-part of Ser. No. 452,990, Dec. 19, 1989, Pat. No. 4,980,328.

[51] Int. Cl.$^5$ .................. C04B 35/18; C04B 35/20; C04B 35/22
[52] U.S. Cl. .................. 501/119; 501/121; 501/122; 501/128; 428/328
[58] Field of Search ............... 501/119, 121, 122, 128, 501/8; 423/328

[56] References Cited

U.S. PATENT DOCUMENTS

| | | | |
|---|---|---|---|
| 3,008,803 | 11/1961 | Schwenzfeger | 178/23 |
| 4,344,851 | 8/1982 | Sherman et al. | 210/670 |
| 4,476,236 | 10/1984 | Inoguchi et al. | 501/119 |
| 4,495,300 | 1/1985 | Sano | 501/119 |
| 4,810,681 | 3/1989 | Hayakawa | 501/119 |
| 4,814,303 | 3/1989 | Chowdry et al. | 501/119 |

FOREIGN PATENT DOCUMENTS

| | | |
|---|---|---|
| 315282 | 3/1988 | European Pat. Off. . |
| 298701 | 5/1988 | European Pat. Off. . |

OTHER PUBLICATIONS

J. R. Moyer et al., "Synthesis of Oxide Ceramic Powders by Aqueous Coprecipitation", Materials Research Soc. Symposium, 73, p. 117 (1986).

D. W. Breck, Zeolite Molecular Sieves, J. Wiley & Sons, N.Y. (1974), pp. 483–496.

*Primary Examiner*—William R. Dixon, Jr.
*Assistant Examiner*—Anthony J. Green
*Attorney, Agent, or Firm*—Thomas K. McBride; Eugene I. Snyder; Frank S. Molinaro

[57] ABSTRACT

This invention relates to processes for preparing ceramic articles which are especially suited for electronic applications. The process involves taking a shaped article which has been formed from a magnesium exchanged zeolite powder, the zeolite selected from the group consisting of philipsite, harmotome, gismondine, zeolite B, zeolite ZK-19 and zeolite W, and sintering it at a temperature of about 1,000° C. to 1,350° C. for about 1 to about 6 hours. The magnesium exchanged zeolite has a $SiO_2/Al_2O_3$ ratio of about 2.3 to about 2.8 and a sodium content less than 0.5 weight percent. The ceramic article that is formed has a substantially crystalline cordierite phase and has a density of at least 90% of its theoretical density. A preferred process involves calcining the magnesium exchanged zeolite powder at a temperature of about 600°–800° C. to collapse the zeolite framework and give upon sintering a cordierite ceramic article which is substantially crack free. A preferred magnesium exchanged zeolite is magnesium exchanged zeolite B. This invention also relates to a substantially crack free and crystalline cordierite ceramic article, the cordierite represented by the empirical formula $2.0\pm0.1$ MgO:2 $Al_2O_3$:$5.0\pm0.2$ $SiO_2$ and has an average grain size of about 10 to about 500 nanometers.

4 Claims, 2 Drawing Sheets

HIGH DENSITY CORDIERITE CERAMICS FROM ZEOLITE

CROSS REFERENCE TO RELATED APPLICATION

This application is a continuation-in-part of prior copending application Ser. No. 07/452,990 filed Dec. 19, 1989 U.S. Pat. No. 4,980,323.

BACKGROUND OF THE INVENTION

Ceramic articles have many uses including catalyst supports, dental porcelain, heat exchangers, turbine blades, substrates for integrated circuits, etc. One of the areas of increasing interest is the use of ceramic articles as electronic substrate materials. To be useful as an electronic substrate, a ceramic material should have a thermal expansion that matches that of silicon metal, low dielectric constant, low electronic conductivity, high thermal conductivity and low sintering temperature. Cordierite is one ceramic material that meets most of these criteria. However, the conventional manner of preparing cordierite involves sintering at temperatures above 1250° C. and the resultant material does not have as high a thermal conductivity as desired. Therefore, there is a need for a process to prepare a high density cordierite at as low a temperature as possible and which has as high a thermal conductivity as possible.

The prior art reveals several ways to prepare cordierite other than the conventional method of sintering the oxides. For example, J. R. Moyer et al. in "Synthesis of Oxide Ceramic Powders by Aqueous Coprecipitation", Materials Research Society Symposium, Vol. 73, p. 117 (1986) discloses preparing cordierite by coprecipitating aluminum, magnesium and silicon compounds and then firing. However, sintering must be carried out at about 1420° C. in order to obtain a cordierite article with a density of at least 97% of its theoretical density.

The prior art also discloses that zeolites can be used to form cordierite. Thus, D. W. Breck in ZEOLITE MOLECULAR SIEVES, John Wiley & Sons, New York (1974), pp. 493–496 states that Mg-X can be heated to form cordierite. The disclosed process involves heating the Mg-X zeolite at 1500° C. to form a glass and then heating the glass above 1000° C. to form cordierite. Thus, two steps are required to form cordierite.

Another reference which teaches the preparation of a cordierite based ceramic article is U.S. Pat. No. 4,814,303 to Chowdry et al. Chowdry discloses producing a monolithic anorthite, anorthite-cordierite or cordierite based ceramic article by heating the Ca, Ca/Mg and Mg forms of zeolites X, Y and A at a temperature of about 900° C. to about 1350° C. Chowdry also discloses that one should maximize the removal of sodium present in the zeolites since sodium ions are known to significantly increase the dielectric constant and dielectric loss.

Finally, European Patent Publication Number 298,701 describes the preparation of a ceramic article having an anorthite phase from a calcium zeolite. The process involves a calcination to form an amorphous product which can then be shaped into an article and sintered at temperatures of about 850°–950° C.

In contrast to this prior art, applicants have discovered that heating a magnesium exchanged phillipsite family zeolite at a temperature of about 1000°–1050° C. produces a ceramic article in which the only crystalline phase is cordierite and which has a density of at least 90% of the theoretical density of cordierite which is 2.51 g/cc. The phillipsite family of zeolite are those natural and synthetic zeolites which have similar framework structures and consequently similar X-ray diffraction patterns but which may have different overall crystal symmetry and chemical composition, e.g., $SiO_2/Al_2O_3$ ratio, cation type and content, water content, etc. The phillipsite family of zeolites are phillipsite, harmotone, gismondine, zeolite B (also known as zeolite P), zeolite ZK-19 and zeolite W.

The advantage to using a Mg phillipsite family zeolite over the Mg-X, Y or A disclosed by Chowdry is that the sodium which is present in the phillipsite family zeolite can be removed much more easily than the sodium in zeolite X, Y or A. This is especially true of zeolites B and W. Therefore, there is an economic advantage to using a phillipsite family zeolite, and especially zeolites B and W over zeolite X, Y or A. Additionally when zeolite X, Y or A is heated at about 1000° C. one obtains a mixture of phases which includes sapphrine, spinel, stuffed beta quartz and mullite, whereas when a phillipsite family zeolite is heated at 1000° C. one only obtains a cordierite phase or a mixture of cordierite and minor amounts of stuffed beta quartz which is a metastable precursor of cordierite (also known as mu-cordierite.) It should be noted that when cordierite is used in this application what is meant is alpha cordierite which has the diffraction pattern set forth in JCPDS #9-472. Finally, the density of a ceramic article prepared by using a phillipsite family zeolite is much higher than that formed using zeolite X, Y and A. Accordingly, applicants have shown unexpected results by using a phillipsite family zeolite, and especially Mg-B zeolite, instead of Mg-X, Y or A.

Applicants have also discovered that cracks in the finished ceramic article can be minimized by first heating a phillipsite family zeolite at a temperature of about 600°–800° C. This heating collapses the zeolite structure, thereby minimizing crack formation and/or propagation. Applicant's process is different from that set forth in Eup. Publ. No. 298,701 in that first applicants are preparing a crack free cordierite ceramic article, whereas the '701 reference involves a process for preparing an anorthite ceramic. Accordingly, the calcination temperature (800°–900° C. disclosed in the '701 reference would initiate crystallization of cordierite, whereas the final sintering temperature disclosed (850°–950° C.) is not sufficiently high to form a high density, crack free cordierite ceramic article. Therefore, there is nothing in the '701 reference to suggest that the process disclosed therein could be used to prepare a crack free cordierite ceramic article.

Further, while Breck at pp. 493–94 of ZEOLITE MOLECULAR SIEVES, teaches a two-step process to make cordierite from Mg-X, the steps involve heating at 1500° C. to form a glass, followed by heating at 1000° C. to form cordierite; there is no mention in Breck that one should collapse the zeolite structure prior to preparing a shaped article in order to minimize crack formation. In fact, Breck does not address the preparation of ceramic articles at all but speaks only about converting Mg-X zeolite to cordierite. Further, Chowdry specifically states at column 3, lines 40–46 that the advantage to their invention is a single firing step. Clearly, applicants are the first to recognize that precollapsing the zeolite framework minimizes cracks in the final ceramic article.

Applicants have additionally discovered that the ceramic article obtained by the present invention has unique properties which are an average grain size of about 10 to about 500 nanometers and a Vickers hardness of about 5 to about 8 GPa. Grain sizes this small have never been observed for a high density cordierite material. This small grain size makes the cordierite ceramic article very ductile.

SUMMARY OF THE INVENTION

This invention relates to processes for making a substantially crystalline cordierite ceramic article. Accordingly, one embodiment is a process comprising sintering a shaped article at a temperature of about 1000° to about 1350° C. for a time of about 1 to about 6 hours, the shaped article consisting essentially of a powder of a magnesium exchanged zeolite having a $SiO_2/Al_2O_3$ ratio from about 2.3 to about 2.8, selected from the group consisting of phillipsite, harmotome, gismondine, zeolite B, zeolite ZK-19 and zeolite W, and having a sodium content less than about 0.5 weight percent, thereby forming a ceramic article characterized in that it has a crystalline cordierite phase and has a density of at least 90% of its theoretical density.

Yet another embodiment is a process for preparing a substantially crystalline and crack free cordierite ceramic article comprising calcining a powder of a magnesium exchanged zeolite, the zeolite having a $SiO_2/Al_2O_3$ ratio from about 2.3 to about 2.8, selected from the group consisting of phillipsite, hormotome, gismondine, zeolite B, zeolite ZK-19 and zeolite W, and having a sodium content less than about 0.5 weight percent, and a particle size less than 10 microns at a temperature of about 600°–800° C. for an effective time to collapse the zeolite framework and provide an amorphous powder, forming the amorphous powder into a shaped article and sintering the shaped article at a temperature of about 1000° to about 1350° C., for a time of about 1 to about 6 hours, thereby forming a ceramic article characterized in that it has a substantially crystalline cordierite phase, has a density of at least 93% of the theoretical density of cordierite and is substantially crack free.

A further embodiment of the invention is a substantially crack-free and crystalline cordierite ceramic article the cordierite represented by the empirical formula

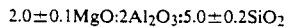

and the ceramic article characterized in that it has a density of at least 93% of its theoretical density and has an average grain size of about 10 to about 500 nanometers.

Another embodiment of the invention is a substantially crack-free and crystalline cordierite ceramic article prepared by the process comprising calcining a powder of a magnesium exchanged zeolite having a $SiO_2/Al_2O_3$ ratio from about 2.3 to about 2.8 selected from the group consisting of phillipsite, harmotome, gismondine, zeolite B, zeolite ZK-19 and zeolite W, and having a sodium content less than about 0.5 weight percent, at a temperature of about 600°–800° C. for a time effective to collapse the zeolite framework and provide an amorphous powder, forming the amorphous powder into a shaped article and sintering the shaped article at a temperature of about 1000° to about 1350° C., for a time of about 1 to about 6 hours, thereby forming a ceramic article characterized in that it has a substantially crystalline cordierite phase, represented by the empirical formula

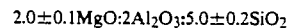

has a density of at least 93% of its theoretical density, is substantially crack free, and has an average grain size of about 50 to about 500 nanometers, the grain size determined by the crystalline size of the magnesium exchanged zeolite.

Other objects and embodiments will become more apparent in the following detailed description.

BRIEF DESCRIPTION OF THE DRAWINGS

FIG. 2a is a SEM photograph of a ceramic bar prepared from the zeolite powder represented in FIG. 1a.

DETAILED DESCRIPTION OF THE INVENTION

Figure 1A:
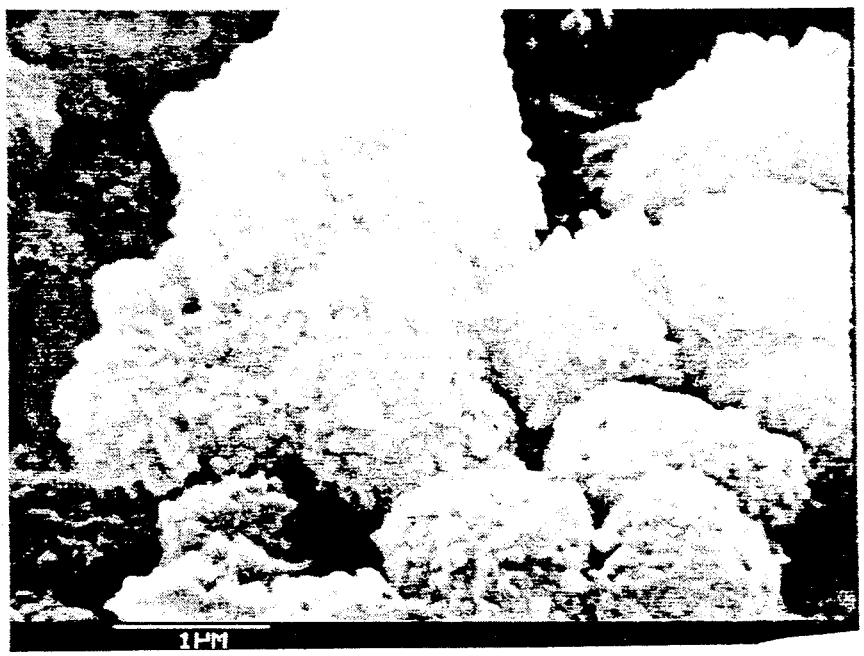
FIG. 1a is a Scanning Electron Microscope (SEM) photograph of a magnesium exchanged zeolite B having small average crystallites prepared as in Example 2.

As stated, this invention relates to a process for preparing a substantially crystalline cordierite ceramic article from a magnesium exchanged phillipsite family zeolite. Zeolites are well known microporous three-dimensional framework structures. In general the crystalline zeolites are formed from corner sharing $AlO_2$ and $SiO_2$ tetrahedra and are characterized as having pore openings of uniform dimensions, having a significant ion-exchange capacity and being capable of reversibly desorbing an adsorbed phase which is dispersed throughout the internal pores or voids of the crystal without displacing any atoms which make up the permanent crystal structure.

Zeolites can be represented on an anhydrous basis, by the formula

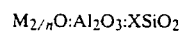

where M is a cation having the valence n, X is generally equal to or greater than 2. In naturally occurring zeolites, M can be Li, Na, Ca, K, Mg and Ba. The M cations are loosely bound to the structure and frequently can be completely or partially replaced with other cations by conventional ion exchange techniques.

The zeolites which can be used in this invention are the phillipsite family or phillipsite group of zeolites which are phillipsite, harmotome, gismondine, zeolite B, zeolite ZK-19 and zeolite W. For a detailed explanation of the structural similarities among these zeolites and a list of references where specific structural information of these zeolites may be found, the reader is referred to U.S. Pat. No. 4,344,851 which is incorporated by reference. The important feature of this family of zeolites is the absence of framework sites which can be either irreversibly occupied by cations such as sodium or potassium or sites which, when occupied effectively, shield other sites from the exchanging cation. Of these zeolites, zeolite B and W are preferred, with zeolite B especially preferred.

In the description which follows, zeolite B will be used to exemplify the process. However, this is not to be construed as limiting the invention in any way to zeolite B.

Zeolite B is a synthetic zeolite having the formula $Na_2O:Al_2O_3:xSiO_2$ where x ranges from about 2 to about 5. The synthesis of zeolite B is described in U.S. Pat. No. 3,008,803 which is incorporated by reference and essentially entails forming a mixture of sodium aluminate ($NaAlO_2$), sodium silicate, sodium hydroxide and colloidal silica, and heating this mixture at a temperature of about 60°–150° C., under autogenous pressure for a time of about 12 to about 96 hours. The resultant product is isolated, washed and dried. The amount of the reactants can be varied such that the $SiO_2/Al_2O_3$ ratio is from about 2 to about 5 and preferably from about 2.3 to about 2.8. Another method of preparing zeolite B or P is that found in European Patent Publication 315,282 which is incorporated herein by reference.

Since the presence of sodium ions in the resultant cordierite ceramic article is detrimental to the desired physical properties, it is necessary to maximize removal of the sodium cations in the zeolite B. Two techniques are generally used to remove the sodium cation. One technique is a multiple ion exchange with the magnesium cation while the other technique involves pre-exchanging the zeolite with a cation such as $NH_4^+$ followed by ion exchange with the magnesium ion.

Ion exchange is conveniently carried out by contacting the zeolite with an aqueous solution of the metal ion to be exchanged. Thus a dilute (about 1 molar) aqueous solution of magnesium nitrate ($Mg(NO_3)_2 6H_2O$) is prepared and the pH of the solution is adjusted to about 7.5 with magnesium hydroxide ($Mg(OH)_2$). The volume of solution which is prepared is that amount which provides from about 5 to about 10 times the amount of magnesium ion needed to fully ion exchange the sodium or other alkali metals in the zeolite.

The contacting of the magnesium nitrate solution with the zeolite can conveniently be carried out in a batch process. Accordingly, the solution is mixed with the zeolite powder and the mixture is refluxed for about 2 hours. Next the mixture is filtered thereby isolating the zeolite powder. This procedure is repeated with a fresh batch of solution until the sodium level is less than 0.5 weight percent and preferably less than 0.2 weight percent. These sodium levels can be achieved after only six repetitions of the ion exchange procedure. Alternatively, the magnesium exchange can be carried out using a continuous process employing methods well known in the art such as placing the zeolite in a column and flowing the magnesium solution through the column or using a basket centrifuge. A continuous process has the advantage of allowing a more efficient utilization of the magnesium solution.

The zeolite may be formed into a desired shape by means well known in the art. A typical method of forming a shaped article involves placing the zeolite powder into a metal die and then pressing the powder at pressures of about 500 to about 50,000 psi (3,440 to about 344,000 kPa). It has been found that the particle size of Mg-B zeolite powder affects the characteristics of the ceramic article. A Mg-B zeolite powder with smaller particles can pack better, thereby forming a ceramic article with higher density. It has been found that a powder which contains smaller particles crystallizes more completely to cordierite in a shorter period of time. Accordingly, it is preferred that the Mg-B zeolite powder have an average particle size smaller than about 10 microns and preferably smaller than about 5 microns.

If the average particle size of the Mg-B zeolite powder is not less than 10 microns, the powder may be milled using conventional milling means such as ball milling, attrition milling and impact milling.

It is also desirable to add a binder to the powder as an aid in forming the shaped article. The binder may be selected from those well known in the art such as polyvinyl alcohol, and polyethylene glycol. If a binder is added, the amount which is to be added is upt to about 15 weight.

In a preferred embodiment, the magnesium B zeolite is treated prior to forming the shaped article. This treatment involves calcining the magnesium B zeolite, in the form of a powder, at a temperature of about 600° to about 800° C. and preferably about 650° to about 750° C. for a time of about 1 to about 2 hours. This calcination collapses the zeolite framework and produces an amorphous powder which provides green (i.e. unsintered) ceramic articles of higher density than the original zeolite. The effect of this calcination step is that cracks in the finished ceramic article are minimized or eliminated.

Having formed the Mg-B zeolite in a desired shape, the shape is now sintered at a temperature of about 1000° C. to about 1350° C. and preferably at a temperature of about 1000° C. to about 1050° C. for a time of about 1 to about 6 hours. The resultant product obtained after sintering has been found to be composed of a substantially crystalline cordierite phase. By substantially crystalline is meant that at least 95% of the material is crystalline. No other crystalline phases have been observed except for minor amounts of mu-cordierite which were occasionally formed at lower sintering temperatures and larger particle sizes. It has also been found that the ceramic article has a density of at least 90% of the theoretical density of cordierite (2.51 g/cc) and a dielectric constant, measured at 1 $MH_z$ of about 5 to 7.5.

The ceramic article of this invention is characterized in that the cordierite phase is represented by the empirical formula

$$2.0\pm0.1MgO:2Al_2O_3:5.0\pm0.2SiO_2$$

This ceramic article is unique in that it has an average grain size of about 10 to about 500 nanometers. The grain size is directly related to the crystallite size of the starting zeolite. That is, a small initial crystallite size will give an extremely fine or small average grain size in the final product. This is the first observance of a cordierite ceramic article having an average grain size less than 500 nanometers. The effect of having such a small grain size is that the ceramic article is very ductile. This is shown by the fact that these articles have a Vickers hardness of about 5 to about 8 GPa. Most fully dense cordierite articles, i.e., those with densities greater than 90% of the theoretical density, have Vickers hardness of greater than 8.5 GPa. It is only porous cordierite articles that exhibit Vickers hardness of less than 8 GPa. Therefore, the instant cordierite articles combine the good ductility of a porous cordierite with the desirable properties of a fully dense cordierite. The improved ductility of these articles makes them easier to machine. Finally, it is anticipated that, because of their small grain size, the ceramic articles of this invention can be further processed by methods such as sinter forging and superplastic forming.

In order to fully illustrate the instant invention, the following examples are set forth. It is to be understood that the examples are only by way of illustration and are not intended as an undue limitation on the broad scope of the invention as set forth in the appended claims.

EXAMPLE 1

This example shows the preparation of MgB zeolite from NaB zeolite. In a container 723.6 g of $Mg(NO_3)_2 \cdot 6H_2O$ were dissolved in 2.0 liter of distilled water and the pH of the solution was adjusted to 7.5 by adding about 0.5 g of $Mg(OH)_2$. To this solution there were added 250 g of NaB zeolite (prepared according to the procedure in U.S. Pat. No. 3,008,803) whose chemical and physical characteristics were: 25.87 wt. % $Al_2O_3$, 41.0 wt. % $SiO_2$, 15.40 wt. % $Na_2O$, 18.30 wt. % LOI and a particle size of 40–50 microns. The chemical formula expressed as the ratio of the oxides on an anhydrous basis was determined to be: 0.98 $Na_2O$:1.0 $Al_2O_3$:2.69 $SiO_2$. The resulting slurry was heated to reflux while stirring for 2 hours.

The zeolite powder was isolated by filtration, after which the powder was reexchanged five more times, each time with equal amounts of freshly prepared $Mg(NO_3)_2$ solution (adjusted to pH 7.5 as above), followed by another filtration. Finally, the powder was washed with a sufficient amount of distilled water to lower the level of nitrate in the filtrate to less than 10 ppm (Quantofix (TM) test paper). The resulting powder was dried at room temperature. Elemental analysis revealed the presence of: 24.40 wt. % $Al_2O_3$, 38.40 wt. % $SiO_2$, 10.10 wt. % MgO, 0.27 wt. % $Na_2O$ and 26.90 wt. % LOI. This sample was designated sample A. The chemical formula expressed as the ratio of the oxides on an anhydrous basis was determined to be: 0.018 $Na_2O$:1.0 $Al_2O_3$:2.67 $SiO_2$:1.05 MgO.

EXAMPLE 2

A MgB zeolite powder was prepared as per example 1 with the following modifications. The solution used for the exchange consisted of 3722 g of $Mg(NO_3)_2 \cdot 6H_2O$ dissolved in 14.5 liters of water and adjusted to a pH of 7.5 with $Mg(OH)_2$. To this solution there were added 2268 of NaB zeolite powder (prepared according to the procedure in Eup. Pat. Publ. 315,282) whose chemical and physical characteristics were: 26.68 wt. % $Al_2O_3$, 38.2 wt. % $SiO_2$, 16.4 wt % $Na_2O$, 18.86 wt. % LOI and a particle size of 2–10 microns. Six separate exchanges were carried out as per example 1 after which analysis of the sample showed: 27.8 wt. % $Al_2O_3$, 39.70 wt. % $SiO_2$, 11.00 wt % MgO, 0.17 wt % $Na_2O$ and 22.30 wt % LOI. The chemical formula expressed as the ratio of the oxides on an anhydrous basis was determined to be: 0.01 $Na_2O$:1.0 $Al_2O_3$:2.42 $SiO_2$:1.0 MgO. This sample was designated sample B1.

EXAMPLE 3

A magnesium B zeolite was prepared by first preparing the ammonium form of the B zeolite and then by exchanging the ammonium ion with magnesium ion. First 203 g of $(NH_4)_2SO_4$ were dissolved in 1.5 liters of distilled water. This solution was added to 150 g of NaB zeolite (prepared as in Example 1) whose chemical analysis was—25.30 wt. % $Al_2O_3$, 41.20 wt. % $SiO_2$, 15.50 wt. % $Na_2O$, 17.90 wt. % LOI: particle size 40–50 microns. The chemical formula expressed as the ratio of the oxides on an anhydrous basis was determined to be: 1.01 $Na_2O$:1.0 $Al_2O_3$:2.76 $SiO_2$. The resulting slurry was heated to reflux with stirring for 2 hr. The zeolite powder was isolated by filtration, after which the powder was reexchanged as above two additional times, each time with freshly prepared solutions. The powder was then washed with 4 liters of distilled water and dried at room temperature. 100 g. of this $NH_4^+$ exchanged powder was further exchanged four more times, each time refluxing for two hours with fresh solutions containing 325 g. of $Mg(NO_3)_2 \cdot 6H_2O$ dissolved in 1.5 liters of distilled $H_2O$. The powder was then washed nitrate free with distilled water and dried at room temperature. Elemental analysis of the powder revealed the presence of 27.20 wt. % $Al_2O_3$, 41.20 wt. % $SiO_2$, 8.62 wt. % MgO, 0.26 wt. % $Na_2O$, 0.80 wt. % N, and 22.30 wt. % LOI. The chemical formula expressed as the ratio of the oxides on an anhydrous basis was determined to be: 0.016 $Na_2O$:1.0 $Al_2O_3$:2.57 $SiO_2$:0.8 MgO:0.11 $(NH_4)_2O$.

EXAMPLE 4

This example shows the preparation of ceramic pellets using magnesium B zeolite. Four pellets were formed by placing about 1 gram portions of sample A into 0.5 inch (1.27 cm) diameter pellet dies. Pellets 1 and 2 were pressed at 10,000 psi while pellets 3 and 4 were pressed at 50,000 psi. The four pellets were heated at 4° C./min. up to 806° C., held there for 8 hours and then heated at 1° C./min up to 1050° C. and held there for 4 hours. The sintered pellets 1, 2, 3 and 4 had densities of 1.73, 1.70, 1.96 and 1.99 g/cc respectively (The respective percents of theoretical density were 69, 68, 78 and 79%). The pellets were ground into a fine powder and analyzed by X-ray diffraction which showed the presence of cordierite and a minor amount (about 10%) of mu-cordierite.

EXAMPLE 5

A 50 g portion of sample A was milled for 18 hours in a jar mill containing alpha alumina grinding media. The mill was filled with sufficient water to cover the media. The particle size of the powder after milling was between 4–5 microns.

Two pellets were formed by placing 1 gram portions of the ground magnesium B zeolite powder into 0.5 inch (1.27 cm) pellet dies and pressing at 10,000 psi. The pellets were removed from the dies and heated at 6° C. per minute to 1050° C. and held at 1050° C. for 4 hours. The resulting pellets each contained a large radial crack. The densities of the two pellets were 2.46 g/cc and 2.44 g/cc (measured geometrically) or 98% and 97% respectively of cordierite's theoretical density (2.51 g/cc). One of the pellets was ground into a fine powder. X-ray diffraction analysis of the powder indicated that the material was well crystallized and the only crystalline species present was cordierite (JCPDS #9-472).

EXAMPLE 6

A portion of sample B1 was used to prepare four ceramic pellets according to the following procedure. Four pellets were made by pressing approximately 1 g each of sample B powder in steel dies. Pellets 1 and 2 were pressed at 10,000 psi and pellets 3 and 4 were pressed at 50,000 psi. The four pellets were heated at 6° C. per minute to 1050° C. and held at 1050° C. for 4 hours. All four pellets were extensively cracked. Pellet 2 had broken into several pieces, making geometric density measurement impossible. Pellets 1, 3 and 4 had densities of 2.37, 2.31 and 2.40 g/cc respectively (The respective percents of theoretical density were 94, 92 and 90%). Pellets 1 and 3 were ground into a fine powder. X-ray diffraction analysis of the two powders revealed that both were highly crystalline and pure cordierite.

EXAMPLE 7

This example shows the preparation of a ceramic pellet using a magnesium zeolite B that has been calcined prior to sintering. A 5 gram portion of sample B was heated in air at 6° C./min. up to 750° C. and held there for 1 hour, followed by cooling to room temperature.

The calcined magnesium B zeolite was used to form two pellets by placing about 1 gram portions into 0.5 inch (1.27 cm) steel dies and pressing at 10,000 psi. The pellets were removed from the dies and heated at 6° C. per minute to 750° C. then at 1° C. per minute to 1050° C., then held at 1050° C. for four hours. The two pellets were crack-free and had densities of 2.46 and 2.52 g/cc. (The respective percents of theoretical density were 98 and 100%) One of the pellets was ground to a fine powder. X-ray diffraction analysis of the powder revealed the presence of pure well-crystallized cordierite.

EXAMPLE 8

Two 0.8 gram portions of sample B1 were calcined as in Example 7 and each portion was combined with two drops of an aqueous solution of 2 wt. % polyvinyl alcohol and 1 wt. % polyethylene glycol and ground in a sapphire mortar and pestle. Each portion was placed in a 0.5 inch (1.27 cm) steel die and pressed at 10,000 psi. The pellets were removed from the dies and heated at 6° C. per minute to 600° C., held at 600° C. for 0.5 hours, then heated at 6° C. per minute to 1050° C., and held at 1050° C. for four hours. The two sintered pellets were crack-free and had densities of 2.41 and 2.38 g/cc (The respective percents of theoretical density were 96 and 95%). One of the pellets was ground to a fine powder X-ray diffraction analysis of the powder revealed the presence of pure well-crystallized cordierite.

EXAMPLE 9

A magnesium B zeolite powder was prepared as in Example 2. A 150 g portion of this magnesium B zeolite powder was calcined at 750° C. for one hour. Three different size pellets were prepared by placing 1 g of the calcined powder in a 0.5 inch (1.27 cm) die, 7 g in a 1 inch (2.54 cm) die and 30 g in a 2.25 inch (5.72 cm) die and pressing at 10,000 psi. The pellets were removed from the dies and heated at 4° C./min up to 600° C. and held there for 1 hour, followed by heating at 4° C./min. up to 1,000° C. and held there for 4 hours. The densities of the ½", 1" and 2¼" pellets were 2.39, 2.35 and 2.47 g/cc respectively (The respective percents of theoretical density were 95, 93 and 98%). X-ray diffraction analysis showed the crystalline phase to be substantially cordierite (at least 95%) with a minor amount of mucordierite.

EXAMPLE 10

This is a comparative example showing the preparation of magnesium X zeolite from NaX zeolite. A solution was prepared by adding 201 g of $MgCl_2$ to 1400 mL of distilled water. To this solution there were added 200 g of NaX zeolite obtained from Union Carbide Corporation, identified as linde 13X and whose analysis showed 24.30 wt. % $Al_2O_3$, 35.30 wt. % $SiO_2$, 14.80 wt. % $Na_2O$ and 26.10 wt. % LOI. The resulting slurry was heated at reflux, while stirring, for 1 hour, after which the powder was isolated by filtration. The powder was re-exchanged five more times as above, each time with 1400 mL of freshly prepared $MgCl_2$ solution. After the final exchange and filtration, the powder was washed until chloride-free and dried at 100° C. Elemental analysis revealed the presence of 3.6 wt. % $Na_2O$. 160 grams of the above MgX powder was further exchanged 6 more times, each time by refluxing the powder in a fresh solution of 158 g of $MgCl_2$ dissolved in 1400 mL of water and filtering between each exchange. The powder was then washed chloride-free and dried at 100° C. 149 grams of the above powder was further exchanged five more times, the first four times with fresh solutions of 365 g of $MgCl_2$ in 1500 mL of $H_2O$, and the fifth time in a solution of 365 g of $MgCl_2$ and 85 mL of 6M HCl in 1200 mL of $H_2O$. The powder was then washed chloride-free and dried at 100° C. Elemental analysis of the powder revealed the presence of 25.70 wt. % $Al_2O_3$, 36.70 wt. % $SiO_2$, 7.70 wt. % MgO, 1.70 wt. % $Na_2O$, and 27.30 wt. % LOI. The chemical formula expressed as the ratio of the oxides on an anhydrous basis was determined to be: 0.11 $Na_2O$:1.0 $Al_2O_3$:2.42 $SiO_2$:0.76 MgO. This sample was designated sample C.

This experiment shows that even after 17 exchanges, the sodium level in the MgX zeolite is on order of magnitude greater than the sodium level in MgB zeolite which was exchanged only 6 times.

EXAMPLE 11

This example shows the preparation of MgX zeolite using magnesium sulfate. A solution was prepared by adding 65.2 g of $Mg(SO_4)_2.7H_2O$ to 550 mL of distilled water. The pH of the solution was adjusted to 7.2 by addition of a small quantity of $Mg(OH)_2$. 100 g of NaX zeolite (Linde 13X, Union Carbide Corp.) was added to the solution and the resulting slurry was heated with stirring at reflux for 2 hours. The zeolite powder was isolated by filtration, after which the powder was reexchanged four more times, each time with equal amounts of freshly prepared $Mg(SO_4)_2$ solution. After the final exchange and filtration, the powder was washed with 3 liters of distilled water. The resulting powder was dried at room temperature. Elemental analysis revealed the presence of 24.2 wt. % $Al_2O_3$, 34.9 wt. % $SiO_2$, 7.15 wt. % MgO, 4.37 wt. % $Na_2O$, and 29.1 wt. % LOI. The chemical formula expressed as the ratio of the oxides on an anhydrous basis was determined to be: 0.11 $Na_2O$:1.0 $Al_2O_3$:2.42 $SiO_2$:0.76 MgO. This sample was designated sample D.

EXAMPLE 12

This example shows the preparation of MgX zeolite by first forming the ammonium form of X zeolite. In a container there were mixed 17.28 g of $NH_4NO_3$ and 1 liter of distilled water. To this solution there were added 50 g of NaX zeolite (chem. analysis-24.2 wt. % $Al_2O_3$, 36.6 wt. % $SiO_2$, 14.6 wt. % $Na_2O$, and 24.6 wt. % LOI) was added to the solution and the resulting slurry was heated with stirring at reflux for 2 hours. The zeolite powder was isolated by filtration, then was exchanged four more times by refluxing in freshly prepared solutions of 109.5 g of $MgCl_2$ in 1 liter of $H_2O$. The product was washed with 2 liters of distilled $H_2O$. Elemental analysis of the powder revealed the presence of 24.0 wt. % $Al_2O_3$, 35.0 wt. % $SiO_2$, 6.57 wt. % MgO, 3.15 wt. % Na$_2$O, and 31.7 wt. % LOI. The chemical formula expressed as the ratio of the oxides on an anhydrous basis was determined to be: 0.22 Na$_2$O:1.0 Al$_2$O$_3$:2.47 SiO$_2$:0.69 MgO. This sample was designated sample E.

EXAMPLE 13

In a container, there were mixed 60.9 g of MgCl$_2$ and 640 mL of distilled water. The pH of the solution was adjusted to 7.5 by addition of a small quantity of Mg(OH)$_2$. 50 g of NaX zeolite (same NaX as in Example 12) was added to the solution and the resulting slurry was heated with stirring at reflux for 2 hours. The zeolite powder was then isolated by filtration, after which the powder was reexchanged five more times, each time with equal amounts of freshly prepared pH adjusted (to pH 7.5) MgCl$_2$ solution. After the final exchange and filtration, the powder was washed with 9 liters of distilled water. The resulting powder was dried at room temperature. Elemental analysis revealed the presence of 23.7 wt. % Al$_2$O$_3$, 33.9 wt. % SiO$_2$, 9.11 wt. % Na$_2$O, and 30.0 wt. % LOI. The chemical formula expressed as the ratio of the oxides on an anhydrous basis was determined to be: 0.12 Na2O:1.0 Al2O3:2.43 SiO2:0.97 MgO. This sample was designated sample F.

EXAMPLE 14

A series of experiments were conducted to compare the densities and phases of the ceramic articles obtained when magnesium X or magnesium B zeolite was used to prepare the ceramic article. One gram portions of samples B1, C, D, E, F and G were placed in 0.5 inch (1.27 cm) steel dies and pressed at 10,000 psi. A fresh set of pellets was prepared for each of the following sintering experiments.

I. All five pellets were simultaneously heated at 4° C./min. to 1050° C. and held there for 3 hours.
II. All five pellets were simultaneously heated at 4° C./min. to 950° C. and held there for 3 hours.
III. All five pellets were simultaneously heated at 4° C./min. to 1250° C. and held there for 4 hours.
IV. All five pellets were simultaneously heated at 4° C./min. to 1350° C. and held there for 3 hours.

The densities and phases of the pellets from experiments I-IV were determined and are reported respectively in Tables I-IV. Abbreviations for phases given in the tables are as follows: Co=cordierite JCPDS #9-472; theoretical density=2.51 g/cc; Am=amorphous; Sa=sapphirine JCPDS #21-549; Qu=stuffed beta quartz also known as mu-cordierite. Each table contains numbered columns under a "Phases" heading. These numbers represent the proportion of any one phase relative to the total product as determined by relative X-ray peak intensities and have the following values: 1=greater than 60%; 2=40%; 3=20%; 4=10% and 5=trace. When only one product is listed and appears in the "1" column, the product was determined to be phase pure by X-ray diffraction.

TABLE I

| | Densities and Phases of Pellets Sintered at 1050° C. | | | | | | |
|---|---|---|---|---|---|---|---|
| | Density | % of | Phases | | | | |
| Sample I.D. | (g/cc) | theoretical | 1 | 2 | 3 | 4 | 5 |
| B1 (MgB) | 2.44/97* | | Co | | | | |
| C (MgX) | 2.30 | | Am | Sa | Mu | | |
| D (MgX) | 1.95 | | Am | Co | | | |
| E (MgX) | 2.62 | | Am | | Mu | Sa | |

TABLE I-continued

| | Densities and Phases of Pellets Sintered at 1050° C. | | | | | | |
|---|---|---|---|---|---|---|---|
| | Density | % of | Phases | | | | |
| Sample I.D. | (g/cc) | theoretical | 1 | 2 | 3 | 4 | 5 |
| F (MgX) | 2.50 | | Am | | Sa | | |

*The theoretical density of cordierite is 2.51 g/cc.

TABLE II

| | Densities and Phases of Pellets Sintered at 950° C. | | | | | | |
|---|---|---|---|---|---|---|---|
| | Density | % of | Phases | | | | |
| Sample I.D. | (g/cc) | theoretical | 1 | 2 | 3 | 4 | 5 |
| B1 (MgB) | 2.46 | | Qu | | | | |
| C (MgX) | 2.16 | | Am | Qu | | | Sa |
| D (MgX) | 1.97 | | Am | Co | | | |
| E (MgX) | 2.60 | | Am | | Mu | | |
| F (MgX) | 2.17 | | Am | | Qu | | Sa |

TABLE III

| | Densities and Phases of Pellets Sintered at 1250° C. | | | | | | |
|---|---|---|---|---|---|---|---|
| | Density | % of | Phases | | | | |
| Sample I.D. | (g/cc) | theoretical | 1 | 2 | 3 | 4 | 5 |
| B1 (MgB) | 2.30/92* | | Co | | | | |
| C (MgX) | sample foamed | | Am | Co | | | |
| D (MgX) | 2.56 | | Am | Co | Sa | | |
| E (MgX) | 1.86 | | Am | Co | Sa | | |
| F (MgX) | 2.11/84* | | Co | | | | |

*The theoretical density of cordierite is 2.51 g/cc.

TABLE IV

| | Densities and Phases of Pellets Sintered at 1350° C. | | | | | | |
|---|---|---|---|---|---|---|---|
| | Density | % of | Phases | | | | |
| Sample I.D. | (g/cc) | theoretical | 1 | 2 | 3 | 4 | 5 |
| B1 (MgB) | 2.34/93* | | Co | | | | |
| C (MgX) | 1.85/74* | | Co | | | | |
| D (MgX) | sample foamed | | Am | Sa | | | |
| E (MgX) | 1.32 | | Am | Co | Sa | | |
| F (MgX) | 1.54/61* | | Co | | | | |

*The theoretical density of cordierite is 2.51 g/cc.

The results presented in Tables I-IV show the advantages which MgB, zeolite has over MgX zeolite in preparing ceramic articles. First the MgB zeolite forms a pure well crystallized cordierite or cordierite plus minor amounts of mucordierite ceramic with a density greater than 91% (>2.28 g/cc) of the theoretical density of cordierite. In contrast, none of the MgX samples form single phase cordierite ceramics of greater than 85% (>2.13 g/cc) of theoretical density. Further, in most cases the major phase of the ceramic pellet derived from the MgX zeolite powders was an amorphous phase. Accordingly, none of the pellets derived from the MgX zeolite samples are suitable for specialty ceramic applications such as electronic applications. Finally, the MgX zeolite samples contain high levels of Na$_2$O whereas the MgB samples have very low levels of Na$_2$O making the MgX derived ceramic unsuitable for electronic applications. Clearly MgB zeolites show unexpected advantages over MgX.

EXAMPLE 15

Approximately 200 g. of sample B1 was heated in air at 6° C./min. up to 750° C. and held there for 1 hour, followed by cooling to room temperature. Approximately 9 g. of the calcined B1 sample were pressed at 4000 psi in an 82.55×8.5 mm steel die. The pellet was removed from the die and heated at 4° C./min. to 600°

C., held there for 1 hour, then at 4° C./min. to 1000° C., and held there for 4 hours. The resulting bar was subjected to a microhardness test by the standard Vickers technique. The measured hardness was 6.9 GPa.

EXAMPLE 16

Figure 1B:
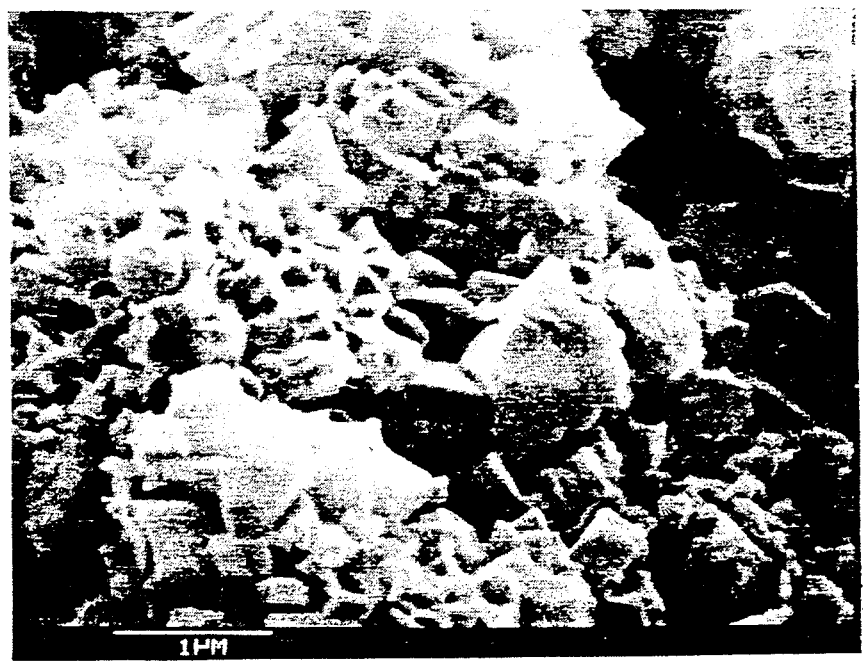
FIG. 1b is a SEM photograph of a magnesium exchanged zeolite B having large crystallites.

Scanning Electron Microscope (SEM) analyses were conducted on several samples and are shown in FIGS. 1 and 2. FIG. 1a is a SEM photograph of sample B1. This photograph shows that the magnesium zeolite B particles are made up of agglomerates of smaller crystallites. FIG. 1b is a SEM photograph of a magnesium zeolite B prepared as in Example 2 except that the sodium aluminate was added slowly (see Eup. Pat. Pub. 315,282 A1). What this photograph shows is that although the particles are about the same size as those in FIG. 1, the crystallites that make up the particles are much larger.

Samples of the magnesium zeolite B powders shown in FIGS. 1a and 1b were formed into ceramic articles by taking 2 g of each sample and calcining them at 750° C. for 1 hour. The calcined samples were pressed at 4000 psi in 1 inch by 0.25 in. and 1 inch diameter steel dies for the small and large crystal samples respectively, removed from the dies and sintered at 1000° C. for 4 hours. Next, these cordierite ceramic articles were imbedded in epoxy, cut to expose a cross-section of the material, polished and then etched for 30 seconds in 1 weight percent HF/H$_2$O.

Figure 2A:
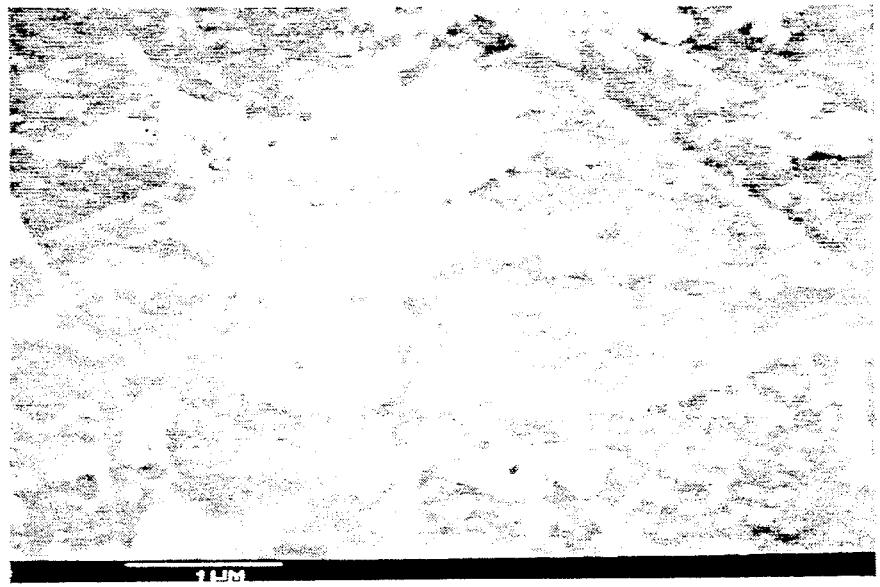
Figure 2B:
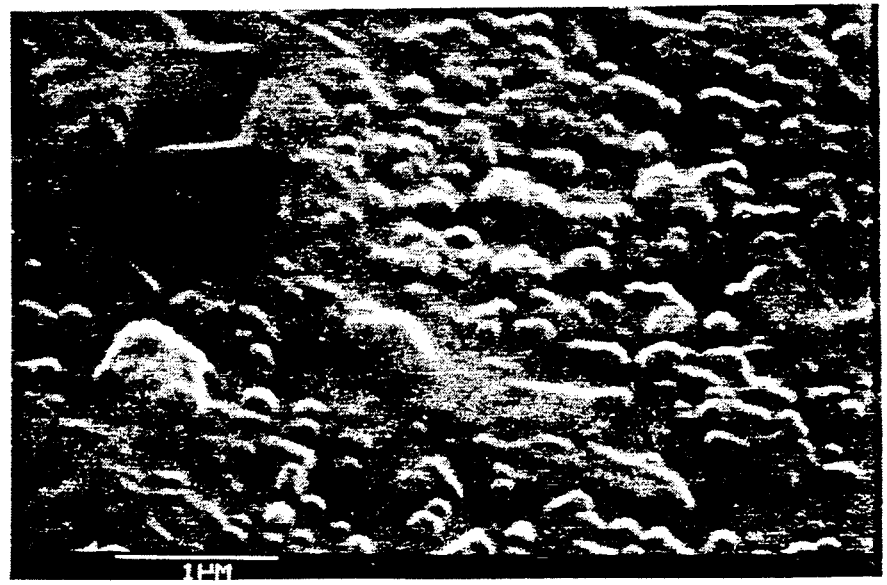
FIG. 2b is a SEM photograph of a ceramic bar prepared from the zeolite powder represented in FIG. 1b.

The SEM photographs of these samples appear in FIGS. 2a and 2b. FIG. 2a shows that sample B1 with small crystallites produces a cordierite ceramic article with an average grain size smaller than 500 nanometers. Although FIG. 2a shows the presence of a few grains larger than 500 nanometers, the majority of the grains are about 75–100 nanometers. In contrast, FIG. 2b which is a photograph of a cordierite article produced from the sample having large crystallite (see FIG. 1b) shows the presence of a number of grains that have a diameter greater than about 500 nanometers, with the majority of the grains being between 125 and 250 nanometers.

What can be concluded from these SEM photographs is that there is a strong correlation between the starting zeolite having small crystallites and the ceramic article having a small average grain size. It is therefore desirable to use a starting zeolite with small crystallites in order to obtain a cordierite article with a small average particle size.

We claim as our invention:

1. A substantially crack free and crystalline cordierite ceramic article the cordierite represented by the empirical formula $$2.0\pm0.1MgO:2Al_2O_3:5.0\pm0.2SiO_2$$

and the ceramic article characterized in that it has a density of at least 93% of its theoretical density and has an average grain size of about 10 to about 500 nanometers.

2. The ceramic article of claim 1 characterized in that it has a Vickers hardness of about 5 to about 8 GPa.

3. A substantially crack free and crystalline cordierite ceramic article prepared by the process comprising calcining a powder of a magnesium exchanged zeolite having a SiO$_2$/Al$_2$O$_3$ ratio from about 2.3 to about 2.8 selected from the group consisting of phillipsite, harmotome, gismondine, zeolite B, zeolite ZK-19 and zeolite W, and having a sodium content less than about 0.5 weight percent, at a temperature of about 600°–800° C. for a time effective to collapse the zeolite framework and provide an amorphous powder, forming the amorphous powder into a shaped article and sintering the shaped article at a temperature of about 1000° to about 1350° C., for a time of about 1 to about 6 hours, thereby forming a ceramic article characterized in that it has a substantially crystalline cordierite phase, represented by the empirical formula $$2.0\pm0.1MgO:2Al_2O_3:5.0\pm0.2SiO_2$$

has a density of at least 93% of its theoretical density, is substantially crack free, and has an average grain size of about 10 to about 500 nanometers, the grain size determined by the crystallite size of the magnesium exchanged zeolite.

4. The ceramic article of claim 3 characterized in that it has a Vickers hardness of about 5 to about 8 GPa.

* * * * *